(12) United States Patent
Maekawa

(10) Patent No.: US 8,975,841 B2
(45) Date of Patent: Mar. 10, 2015

(54) MOTOR CONTROL DEVICE

(71) Applicant: Kabushiki Kaisha Toshiba, Tokyo (JP)

(72) Inventor: Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 13/788,534

(22) Filed: Mar. 7, 2013

(65) Prior Publication Data

US 2013/0257324 A1 Oct. 3, 2013

(30) Foreign Application Priority Data

Mar. 30, 2012 (JP) .................................. 2012-080894

(51) Int. Cl.
  H02P 6/08 (2006.01)
  H02P 21/00 (2006.01)
  H02P 21/14 (2006.01)
(52) U.S. Cl.
  CPC ............ *H02P 21/14* (2013.01); *H02P 21/0089* (2013.01)
  USPC .................................. 318/400.02; 318/400.15
(58) Field of Classification Search
  USPC ............ 318/400.01, 400.02, 400.07, 400.15, 318/432, 437
  See application file for complete search history.

(56) References Cited

U.S. PATENT DOCUMENTS

| 5,504,404 | A | * | 4/1996 | Tamaki et al. | 318/432 |
| 2001/0019251 | A1 | * | 9/2001 | Nakazawa | 318/701 |
| 2005/0253540 | A1 | * | 11/2005 | Kobayashi et al. | 318/254 |

FOREIGN PATENT DOCUMENTS

| JP | 11-299297 | 10/1999 |
| JP | 2003-274699 | 9/2003 |

OTHER PUBLICATIONS

Japanese Office Action issued Feb. 4, 2014, in Japan Patent Application No. 2012-080894 (with English translation).

* cited by examiner

*Primary Examiner* — Bentsu Ro
(74) *Attorney, Agent, or Firm* — Oblon, McClelland, Maier & Neustadt, L.L.P.

(57) ABSTRACT

A motor control device includes a torque computing section which computes an output torque of an electric motor which is capable of generating magnetic torque by permanent magnets and reluctance torque, a flux weakening angle computing section which determines an angle of a flux weakening current vector that is added to a reference current vector so that a command torque value and the computed torque value correspond with each other, a voltage acquiring section which acquires a terminal voltage of the motor, a flux weakening amplitude computing section which determines an amplitude of the flux weakening current vector so that the terminal voltage of the motor is not more than a maximum voltage applicable to the motor, and a command current computing section which computes a command current vector by adding the flux weakening current vector to the reference current vector.

18 Claims, 7 Drawing Sheets

MOTOR CONTROL DEVICE

CROSS-REFERENCE TO RELATED APPLICATIONS

This application is based upon and claims the benefit of priority from the prior Japanese Patent Application No. 2012-080894 filed on Mar. 30, 2012, the entire contents of both of which are incorporated herein by reference.

FIELD

Embodiments described herein relate to a motor control device controlling an electric motor which is capable of generating magnet torque and reluctance torque.

BACKGROUND

A permanent magnet type motor and a reluctance motor are driven by an inverter in systems such as electric trains and electric vehicles. In this case, a terminal voltage of the motor cannot exceed a maximum voltage the inverter can output. This necessitates execution of a flux weakening control so that the terminal voltage of the motor is not more than the maximum voltage during a constant power drive with high speed rotation. In the flux weakening control of the permanent magnet motor, an armature current is generally caused to flow in such a manner that magnetic flux generated by permanent magnet and magnetic flux generated by the armature current are directed opposite each other, that is, a negative d-axis current is generally caused to flow.

However, there is a possibility that control of the permanent magnet motor would become unstable when current for the flux weakening control is caused to fixedly flow in the direction of the d-axis in execution of the flux weakening control for an electric motor generating composite torque that is a combination of torque generated by permanent magnet (hereinafter, "magnet torque") and reluctance torque. The reason for this is that the flux weakening control interferes with torque control that is executed to obtain a desired torque by control of current amplitude, with the result that effect of the flux weakening control cannot be achieved. Consequently, the motor terminal voltage cannot be limited to a range not more than a maximum voltage the inverter can output.

The aforementioned phenomenon is also likely to occur in an interior permanent magnet motor which includes permanent magnets embedded in a rotor core and outputs a composite torque that is a combination of magnet torque and reluctance torque. In view of the phenomenon, there has conventionally been provided a technique of carrying out the flux weakening control so that a constant torque curve changing in a curvilinear manner depending upon the depth or degree of flux weakening is followed.

DETAILED DESCRIPTION

In general, according to one embodiment, a motor control device includes a torque computing section which computes an output torque of an electric motor which is capable of generating magnetic torque by permanent magnets and reluctance torque. A flux weakening angle computing section determines an angle of a flux weakening current vector that is added to a reference current vector so that a command torque value and the computed output torque value correspond with each other. A voltage acquiring section acquires a terminal voltage of the motor. A flux weakening amplitude computing section determines amplitude of the flux weakening current vector so that the terminal voltage of the motor is not more than a maximum voltage applicable to the motor. A command current computing section computes a command current vector by adding the flux weakening current vector to the reference current vector.

Figure 1:
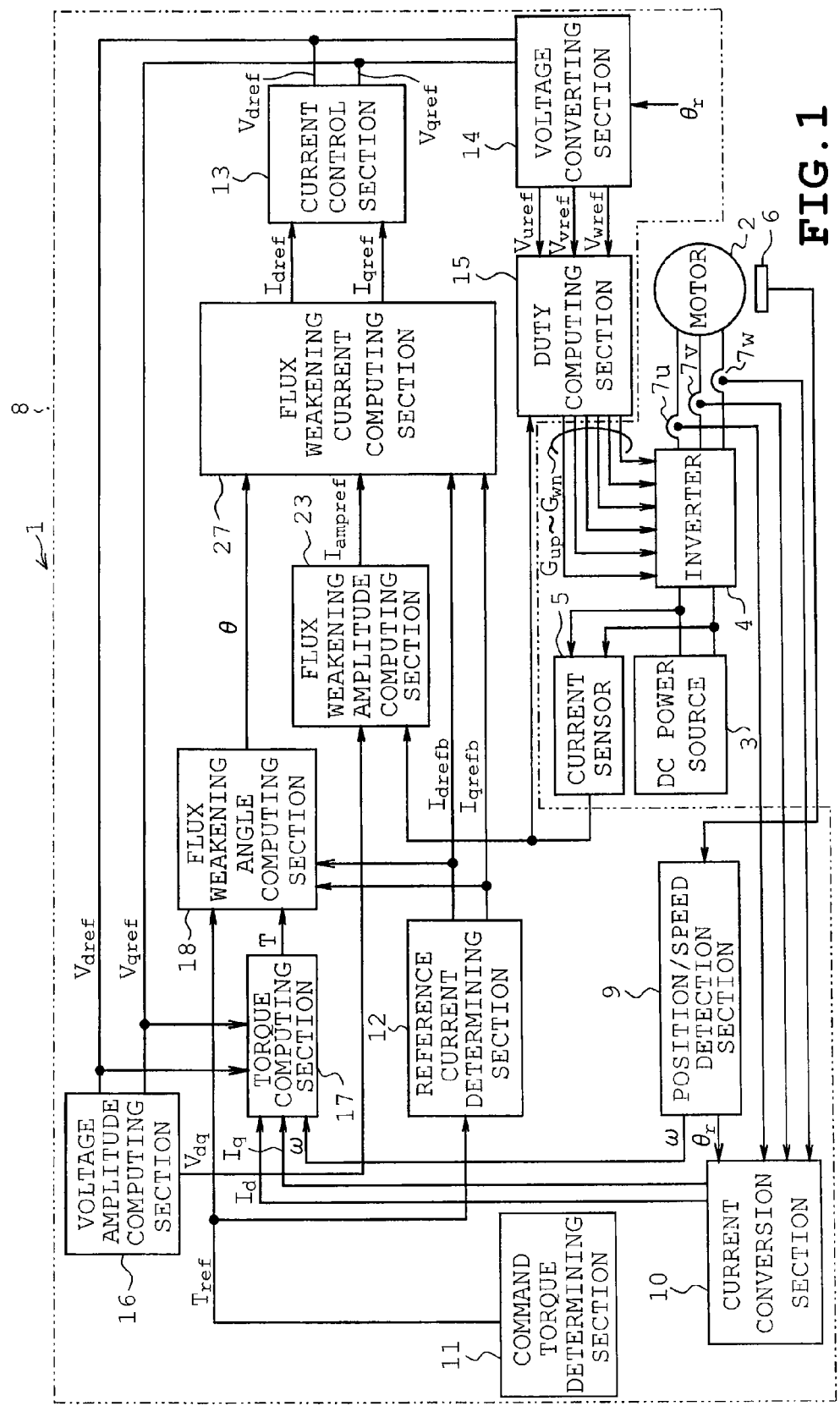
FIG. 1 is a block diagram showing an electrical arrangement of the motor control device according to one embodiment.

One embodiment will be described with reference to the accompanying drawings. Referring first to FIG. 1, a motor control device 1 is shown which controls a permanent magnet type motor 2 in which permanent magnets are embedded inside a rotor core. The permanent magnet type motor 2 (hereinafter, "motor 2") is capable of generating magnet torque by means of the permanent magnets and reluctance torque by means of magnetic saliency.

The motor control device 1 includes a main circuit composed of a DC power supply 3 supplying DC voltage $V_{dc}$, an inverter 4 constituted by connecting switching elements such as IGBTs into a three-phase bridge configuration, a voltage sensor 5 detecting the magnitude of the DC voltage $V_{dc}$ a position sensor 6 detecting a position of a rotor of the motor 2, current sensors $7_u$, $7_v$ and $7_w$ detecting U-phase, V-phase and W-phase currents $I_u$, $I_v$, and $I_w$ respectively and the like. The position sensor 6 is configured by a Hall IC, and the current sensors $7_u$, $7_v$ and $7_w$ are configured by respective Hall CTs, for example.

A control section 8 including components other than those of the main circuit is realized by software processing by the use of a microcomputer. The microcomputer includes a CPU, a RAM, a nonvolatile memory (a ROM, flash memory and the like), an I/O port for input and output of a position signal and gate signals, a serial communication circuit for communication with a higher-level device, an A/D converter executing A/D conversion of the DC voltage $V_{dc}$ and phase currents $I_u$, $I_v$ and $I_w$, and a timer used for PWM processing.

A position/speed detection section 9 carries out angular interpolation processing and rotating speed detection processing with respect to a position signal generated and supplied by the position sensor 6 and changing per 60° electrical angle, computing a rotation phase angle $\theta_r$, having an improved angular resolution and a rotating speed $\omega$. A current conversion section 10 carries out a three-phase to two-phase conversion together with a rotation coordinate conversion and more specifically, the current conversion section 10 converts three-phase currents $I_u$, $I_v$ and $I_w$ of coordinate system at rest to two-phase currents $I_d$ and $I_q$ of rotation coordinate system, based on the rotation phase angle $\theta_r$.

A command torque determining section 11 determines a command torque $T_{ref}$ requisite in a feedback control of torque or rotating speed. A reference current determining section 12 determines d-axis current $I_d$ and q-axis current $I_q$ on the basis of the command torque $T_{ref}$ so that current amplitude $I_{amp}$ becomes minimum. Currents determined according to the current amplitude minimum reference will be referred to as a reference d-axis current $I_{drefb}$ and a reference q-axis current $I_{qrefb}$.

Output torque T of the motor 2 combining the magnet torque with the reluctance torque is shown by the following equation (1) and the current amplitude $I_{amp}$ is shown by the following equation (2):

$$T = I_q \phi + P(L_d - L_q) I_d I_q \quad (1)$$

$$I_{amp} = (I_d^2 + I_q^2)^{1/2} \quad (2)$$

where $\phi$ is an armature interlinkage flux (induced voltage constant) by the use of permanent magnets, $L_d$ and $L_q$ are d-axis inductance and q-axis inductance respectively and P is pole pair number. The number of combinations which renders the current amplitude $I_{amp}$ of the left side of equation (2) minimum is only one although a large number of combinations of d-axis current $I_d$ and q-axis current $I_q$ which can generate the torque T in the left side of equation (1). The reference current determining section 12 determines the reference d-axis and q-axis currents $I_{drefb}$ and $I_{qrefd}$ as command currents, based on the computation using the equations (1) and (2) or a table stored on a memory. A current vector on the dq coordinate axes comprising the reference d-axis and q-axis currents $I_{drefb}$ and $I_{qrefd}$ will be referred to as "reference current vector". An angle $\theta_b$ (reference angle) of the reference current vector is defined with the positive direction of q-axis as 0° (see FIG. 7).

A current control section 13 executes a PI control or the like to determine a command d-axis voltage $V_{dref}$ and a command q-axis voltage $V_{qref}$ so that the command d-axis current $I_{dref}$ and the command q-axis current $I_{qref}$, both finally determined by a flux weakening control that will be described later, correspond to the detected d-axis current $I_d$ and q-axis current $I_q$ respectively. A voltage converting section 14 carries out a rotation coordinate conversion and a two-phase to three-phase conversion, thereby converting two-phase command voltages $V_{dref}$ and $V_{qref}$ of the rotating coordinate system to three-phase command voltages $V_{uref}$, $V_{vref}$ and $V_{wref}$ of the coordinate system at rest, based on the rotation phase angle $\theta_r$.

A duty computing section 15 determines three-phase output duty ratios from three-phase voltage commands $V_{uref}$, $V_{vref}$ and $V_{wref}$ and the DC voltage $V_{dc}$, generating and supplying gate signals $G_{up}$, $G_{vp}$, $G_{wp}$, $G_{un}$, $G_{vn}$ and $G_{wn}$ to each of which is added dead time for preventing short-circuit of the switching element constituting the inverter 4. A voltage amplitude computing section 16 serving as a voltage acquiring section computes a voltage amplitude $V_{dq}$ by the use of equation (6) which will be described later, from a command d-axis voltage $V_{dref}$ and a command q-axis voltage $V_{qref}$ of the inverter 4. The voltage amplitude $V_{dq}$ equals a terminal voltage of the motor 2.

A torque computing section 17 computes output torque T1 and output torque T2 by the use of two types of computing manners. The torque computing section 17 then computes output torque T of the motor 2 using either output torque T1 or T2 or a weighted mean of output torque T1 and output torque T2 according to a switching condition as will be described later. In the first computing manner, the torque operation section 17 obtains magnet torque and reluctance torque independently by the use of armature interlinkage flux $\phi$, currents $I_d$ and $I_q$ and inductances $L_d$ and $L_q$ based on the aforementioned equation (1). The torque computing section 17 adds the magnet torque and the reluctance torque thereby to compute first output torque T1. In the second computing manner, the torque computing section 17 subtracts copper loss and iron loss from output power and divides the result of subtraction by the rotating speed $\omega$, based on the following equation (3), thereby computing the second output torque T2:

$$T = ((V_{dref} I_d + V_{qref} I_q) - R I_{dq}^2 - V_{dq}^2 / Rc) \omega \quad (3)$$

where R is winding resistance of motor 2, $I_{dq}$ is the magnitude of current vector ($I_d$, $I_q$) and Rc is equivalent iron loss resistance. The first term of the numerator of equation (3) represents power the inverter 4 supplies to the motor 2. The second term of the numerator represents copper loss of the motor 2. The third term of the numerator represents iron loss of the motor 2. More specifically, the numerator represents mechanical output power of the motor 2. The denominator of equation (3) represents the rotating speed $\omega$ of the motor 2. Accordingly, the torque computing section 17 computes output power per unit rotating speed, that is, torque.

A flux weakening angle computing section 18 computes an angle $\theta$ of flux weakening current vector so that the command torque $T_{ref}$ supplied from the command torque determining section 11 corresponds to the torque T obtained by the torque computing section 17. The flux weakening current vector is a current vector added to a reference current vector when a flux weakening control is executed (see FIG. 7). The angle $\theta$ of flux weakening current vector is an angle obtained by subtracting electrical angle of 90° from an actual flux weakening current vector on the dq coordinate axes with q-axis positive direction defined as 0°. In other words, the angle $\theta$ is defined as an angle measured from the d-axis negative direction.

Figure 2:
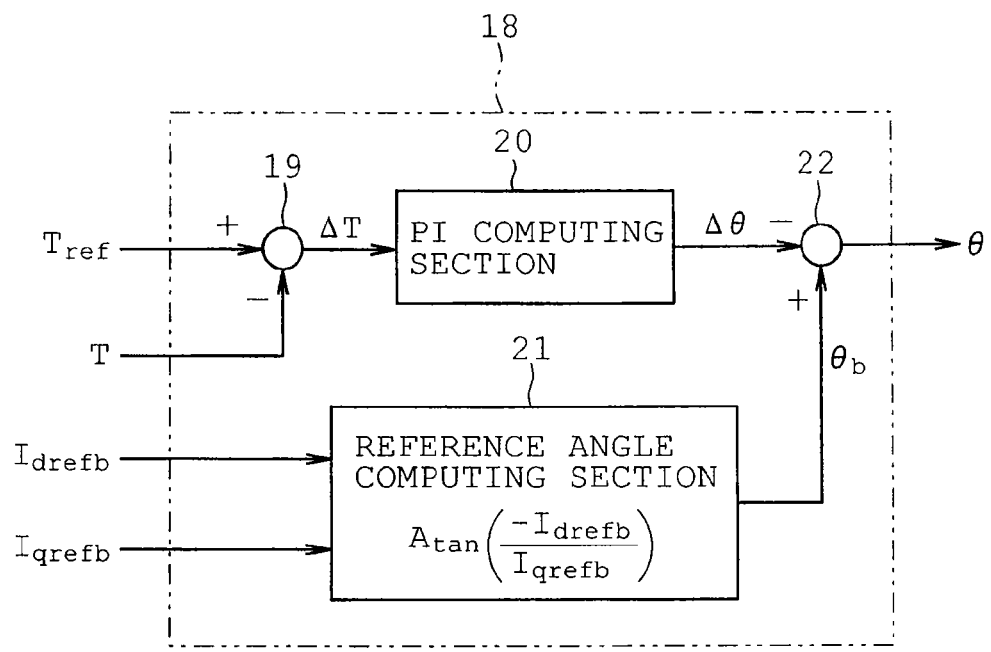
FIG. 2 is a block diagram showing an electrical arrangement of a flux weakening angle computing section.

The flux weakening angle computing section 18 is configured to compute in a manner as shown in FIG. 2. A subtractor 19 subtracts computed torque T from the command torque $T_{ref}$ thereby to obtain a torque difference $\Delta T$. A PI computing section 20 is configured to execute a PI computation with respect to the torque difference $\Delta T$ to obtain a correction angle $\Delta \theta$. A reference angle computing section 21 is configured to compute a reference angle $\theta b$ of the reference current vector determined according to the above-described minimum reference of current amplitude. The reference angle $\theta b$ is also defined with q-axis positive direction defined as 0°. Another subtractor 22 subtracts the correction angle $\Delta \theta$ from the reference angle $\theta b$ to obtain an angle $\theta$ (flux weakening current angle) of the flux weakening current vector.

Figure 3:
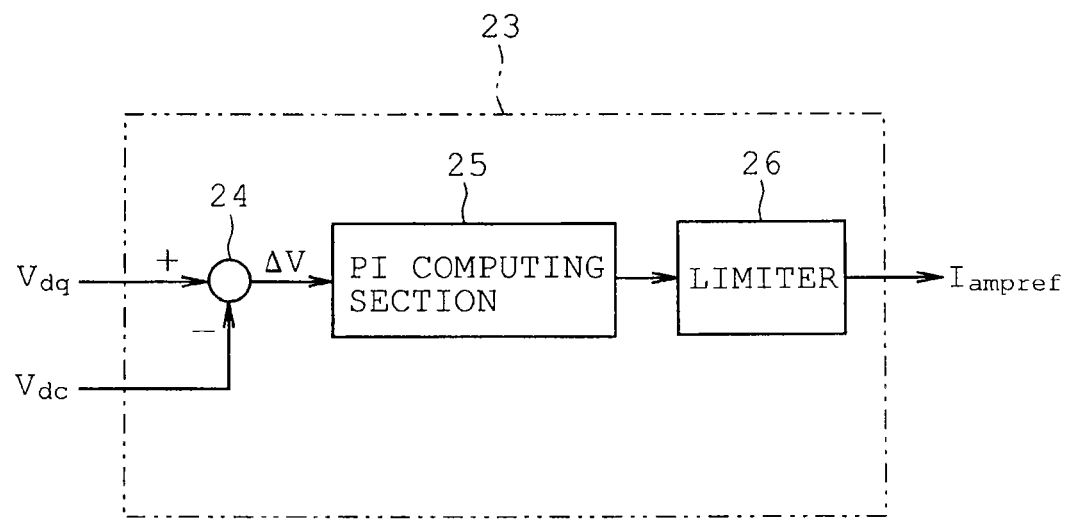
FIG. 3 is a block diagram showing an electrical arrangement of a flux weakening amplitude computing section.

A flux weakening amplitude computing section 23 is configured to compute the amplitude $I_{ampref}$ of the flux weakening current vector so that the motor terminal voltage, that is, the voltage amplitude $V_{dq}$ are not more than DC voltage $V_{dc}$ that is the maximum voltage the inverter 4 can output. More specifically, the flux weakening amplitude computing section 23 is configured to compute in a manner as shown in FIG. 3. Further another subtractor 24 subtracts the DC voltage $V_{dc}$ from the voltage amplitude $V_{dq}$ and a PI computing section 25 is configured to execute a PI computation with respect to the voltage difference $\Delta V$ thereby to obtain amplitude $I_{ampref}$ (flux weakening current amplitude) of the flux weakening current vector $I_{ampref}$. A limiter 26 limits the amplitude $I_{ampref}$ to 0 when the amplitude $I_{ampref}$ is negative, that is, when the voltage amplitude $V_{dq}$ is lower than the DC voltage $V_{dc}$. The reason for this is that no flux weakening control is requisite.

A flux weakening current computing section 27 serves as a command current computing section. To the flux weakening current computing section 27 are supplied the flux weakening current angle θ obtained by the flux weakening angle computing section 18, the flux weakening current amplitude $I_{ampref}$ obtained by the flux weakening amplitude computing section 23, and the reference d-axis current $I_{drefb}$ and the reference q-axis current $I_{qrefb}$ both determined by the reference current determining section 12. The flux weakening current computing section 27 is configured to compute a final command d-axis current $I_{dref}$ and a final command q-axis current $I_{qref}$ using equations (10) and (11) both of which will be described later. In the computation, the flux weakening current computing section 27 adds the flux weakening current vector to the reference current vector thereby to determine a command current vector. Consequently, the flux weakening control is executable at the current rotating speed ω so that the command torque $T_{ref}$ can be supplied.

Figure 4:
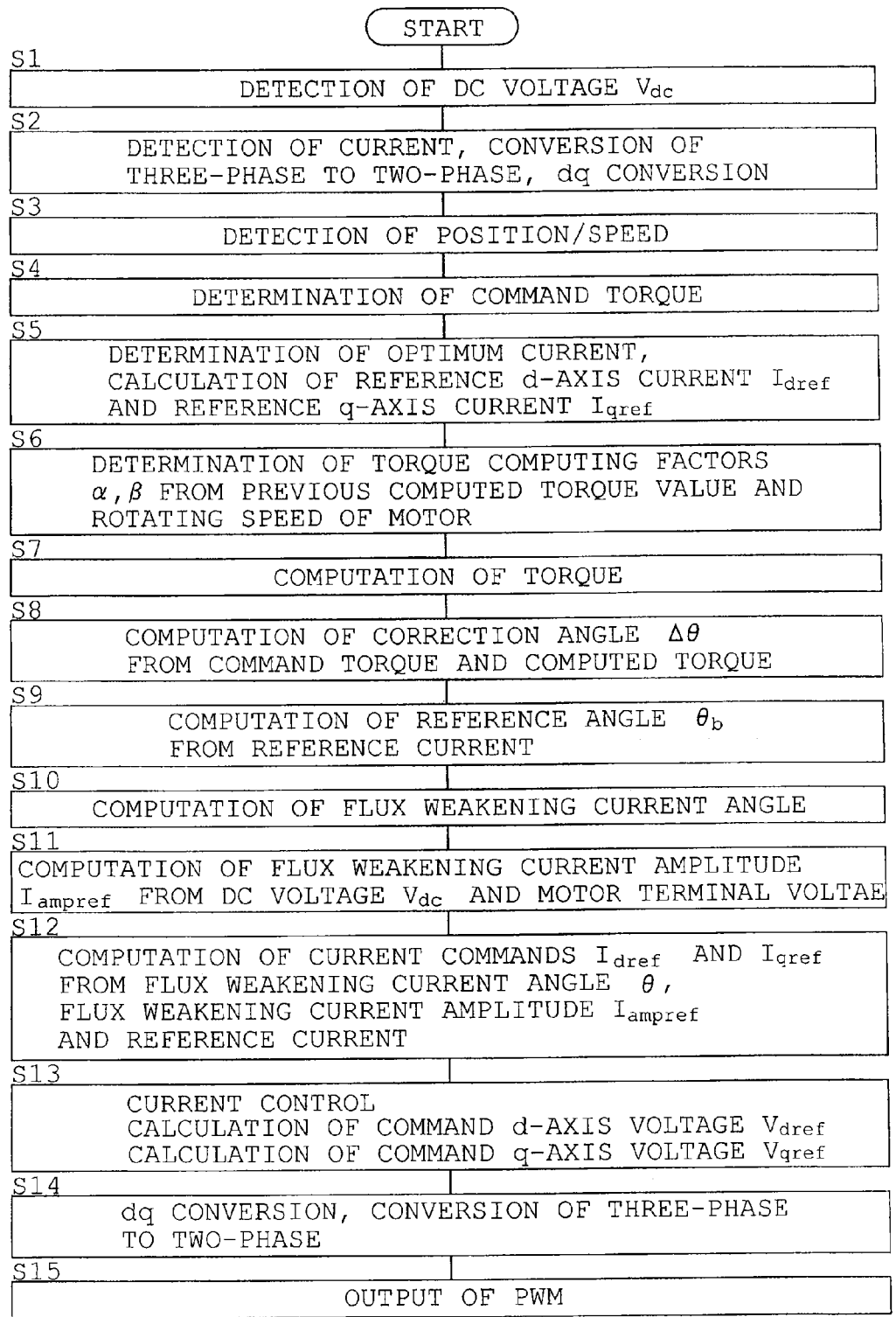
FIG. 4 is a flowchart showing motor control processing involved in the flux weakening control.

FIG. 4 shows motor control processing pertaining to a flux weakening control executed by the control section 8. The flux weakening control will briefly be described with reference to the flowchart of FIG. 4 before detailed description of the working of the motor control device 1. The control section 8 executes processing in steps S1 to S15 every predetermined control period. The control section 8 detects the magnitude of DC voltage $V_{dc}$ by the voltage sensor 5 (step S1). The control section 8 detects currents $I_u$, $I_v$ and $I_w$ by the respective current sensors 7u, 7v and 7w and converts the detected currents to d-axis current Id and q-axis current $I_q$ by the current conversion section 10 (step S2). The control section 8 further detects the rotation phase angle θr and the rotating speed ω by the position/speed detection section 9 (step S3).

Subsequently, the control section 8 determines the command torque $T_{ref}$ by the command torque determining section 11 (step S4) and calculates optimum reference d-axis current $I_{drefb}$ and optimum reference q-axis current $I_{qrefb}$ by the reference current determining section 12 such that the current amplitude becomes minimum (step S5). Based on the previously computed torque T and the rotating speed ω detected at step S3, the control section 8 determines factors α and β used in the computation to obtain torque (step S6) though the factors α and β will be described in detail later. In this case, the factors α and β are desirably determined using a function expression or a table making the connection between torque T and rotating speed ω, and the factors α and β. The control section 8 computes the output torque T of the motor 2 by the torque computing section 17 (step S7).

The control section 8 subsequently activates the PI operation section 20 of the flux weakening current computing section 18 to obtain the correction angle Δθ by the PI computation on the basis of the command torque $T_{ref}$ and the computed torque T (step S8) and further activates the reference angle computing section 21 to compute the reference angle $θ_b$ on the basis of the reference d-axis current $I_{drefb}$ and the reference q-axis current $I_{qrefb}$ (step S9). The control section 8 then subtracts the correction angle Δθ from the reference angle $θ_b$ thereby to obtain the flux weakening current angle θ (step S10). In parallel with computation of the flux weakening current angle θ, the control section 8 activates the flux weakening amplitude computing section 23 to compute the flux weakening current amplitude $I_{ampref}$ based on the DC voltage $V_{dc}$ and the motor terminal voltage (voltage amplitude $V_{dq}$; and step S11).

The control section 8 further activates the flux weakening current computing section 27 to compute the command d-axis current $I_{dref}$ and the command q-axis current $I_{qref}$ based on the flux weakening current angle θ, the flux weakening current amplitude $I_{ampref}$, the reference d-axis current $I_{drefbr}$, the reference q-axis current $I_{qrefb}$ (step S12). The control section 8 then activates the current control section 13 to perform a PI computation of current control to obtain the d-axis voltage $V_{dref}$ and the q-axis voltage $V_{qref}$ (step S13) and further activates the voltage converting section 14 to convert the obtained d-axis voltage $V_{dref}$ and the q-axis voltage $V_{qref}$ to command voltages $V_{uref}$, $V_{vref}$ and $V_{wref}$ (step S14). The control section 8 subsequently activates the duty computing section 15 to generate and supply gate signals $G_{up}$ to $G_{wn}$ having respective PWM waveforms (step S15).

Figure 5:
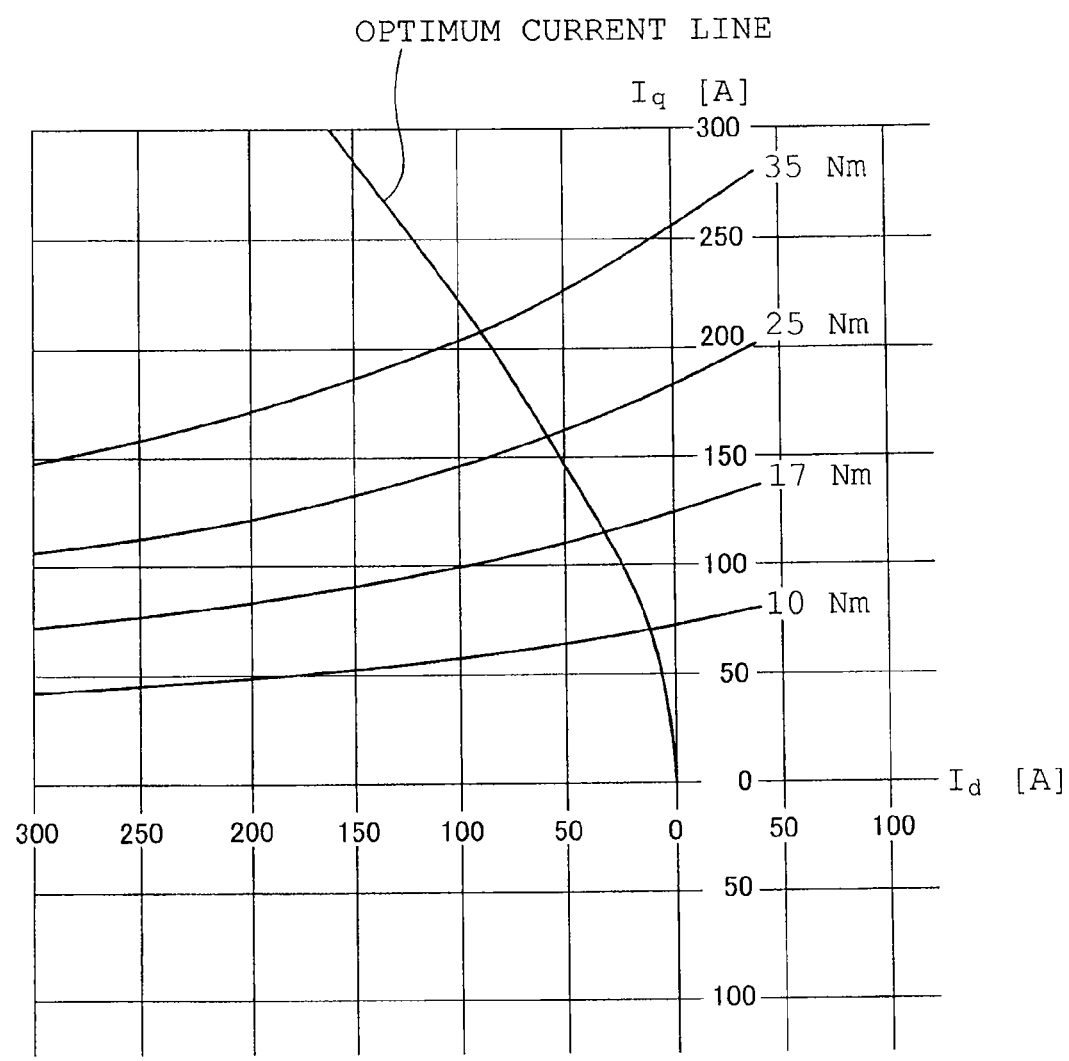
FIG. 5 is a graph showing an optimum current line and constant torque curves on dq coordinate axes.

The motor control device 1 thus configured will work in a manner as described below with reference to FIGS. 5 to 8 as well as FIGS. 1 to 4. FIG. 5 shows an optimum current line and constant torque curves of the motor 2 having substantially 5 kW of rated power. The optimum current line and the constant torque curves are plotted on the dq coordinate axes. The optimum current line represents the trajectory of the reference current vector including the reference d-axis current $I_{drefb}$ and the reference q-axis current $I_{qrefb}$ both of which the reference current determining section 12 has determined according to the minimum reference of current amplitude. The constant torque curves represent trajectories the current vectors follow respectively. The current vectors include the d-axis currents and q-axis currents necessary for output of torque of 10 Nm, 17 Nm, 25 Nm and 35 Nm by the calculation on the basis of equation (1).

As understood from equation (1), torque generated by the permanent magnet motor 2 using both magnet torque and reluctance torque concurrently depends upon not only q-axis current $I_q$ but also d-axis current $I_d$. Since d-axis inductance $L_d$ is smaller than q-axis inductance $L_q$ ($L_d < L_q$) in the common motor 2, reluctance torque can be obtained by causing negative d-axis current $I_d$ to flow. Accordingly, in order that the efficiency may be improved with the current amplitude being rendered minimum, the reference d-axis current $I_{drefb}$ needs to be increased in the negative direction with increase in the output torque. However, an excessive increase in the d-axis current results in increase in the current amplitude.

The d-axis voltage $V_d$, the q-axis voltage $V_q$ and the voltage amplitude $V_{dq}$ all necessary in the case of causing the d-axis current $I_d$ and the q-axis current $I_q$ to flow are shown by the following equations (4), (5) and (6) respectively:

$$V_d = RI_d - \omega L_q I_q \tag{4}$$

$$V_q = RI_q + \omega L_d I_d + \omega \phi \tag{5}$$

$$V_{dq} = 3^{1/2}(V_d^2 + V_q^2)^{1/2} \tag{6}$$

The voltage amplitude $V_{dq}$ (motor terminal voltage) in equation (6) needs to be not more than the DC voltage $V_{dc}$ that is a maximum voltage the inverter 4 can output. Accordingly, the voltage amplitude $V_{dq}$ is limited by equation (7):

$$V_{dq} \leq V_d \tag{7}$$

Figure 6:
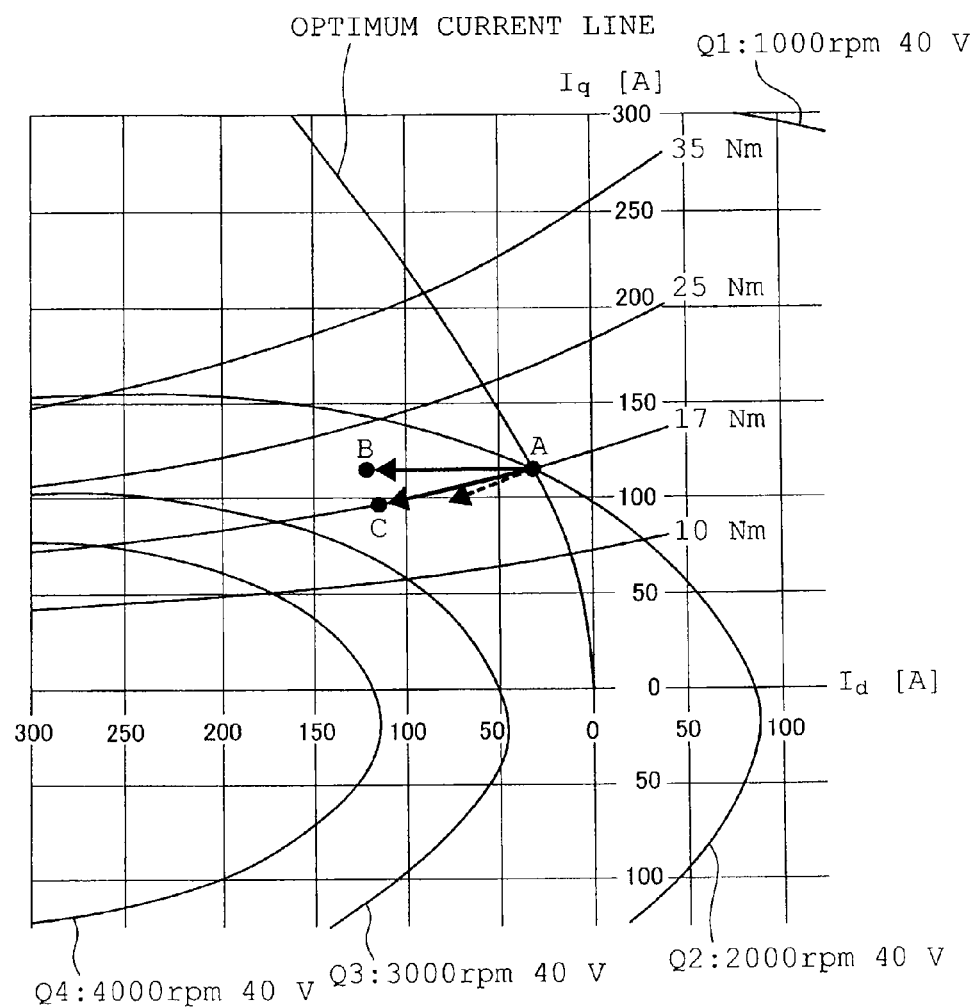
FIG. 6 is also a graph showing circles representing respective constant voltages together with the optimum current line and the constant torque curves in FIG. 5.

More specifically, the voltage amplitude $V_{dq}$ is more susceptible to the limitation of equation (7) as the DC voltage $V_{dc}$ is low or as the rotating speed ω is high, whereupon electric current usable for energization is limited. FIG. 6 plots circles (ellipses in the embodiment) Q1 to Q4 representing constant voltages on the dq coordinate axes in addition to the optimum current line and constant torque curves of FIG. 5. The constant voltage circles Q1 to Q4 represent ranges of energizable currents in the case where the DC voltage $V_{dc}$ is set at 40 V and the rotating speed ω is set at 1000 rpm, 2000 rpm, 3000 rpm and 4000 rpm by calculation on the basis of equations (4) to (7) respectively. Assume now the case where the d-axis current $I_d$ and the q-axis current $I_q$ are caused to flow so that the motor 2 can generate the command torque $T_{ref}$. In this case, for example, when the rotating speed ω of the motor 2 is at 1000 rpm and the DC voltage $V_{dc}$ is at 40 V, an energizable range is within the constant voltage circle Q1 and accordingly very wide. When the optimum current line is within the constant voltage circle Q1, the command d-axis current $I_{dref}$ and the command q-axis current $I_{qref}$ can be determined along the optimum current line. Accordingly, the flux weakening control is not carried out in this driving state.

On the other hand, when the rotating speed ω of the motor 2 is at 2000 rpm and the DC voltage $V_{dc}$ is at 40 V, the torque can be increased by increasing current along the optimum current line until point A in FIG. 6 is reached where the optimum current line and the constant voltage circle Q2 intersect each other. However, since the section of the optimum current line above point A is out of the constant voltage circle Q2, the voltage necessary to cause current to flow cannot be ensured with the result that the motor 2 cannot be energized. In this case, a flux weakening control manner has conventionally been employed to enlarge an operable range. The d-axis current $I_d$ is caused to flow in the negative direction in this conventional flux weakening control manner. In this case, when caused to flow through point A, the negative d-axis current as the flux weakening current assumes a value indicated by point B in FIG. 6. Consequently, since the current comes into the constant voltage circle Q2, the voltage is rendered sufficient with the result that torque can be increased.

However, when the above-described conventional flux weakening control is executed in an actual motor control, point B shifts upward from the constant torque curve of 17 Nm passing through point A. Accordingly, output torque is increased with current change from point A to point B. Thus, in the execution of control based on the command torque $T_{ref}$, the flux weakening control in which the d-axis current $I_d$ is caused to flow in the negative direction becomes a disturbance. In order that the disturbance may be avoided in execution of torque control, it is desirable that the flux weakening current vector to be added for the flux weakening control should be directed along the constant torque curve but not in the d-axis direction. It is desirable in the case as shown in FIG. 6 that the flux weakening current should be caused to flow from point A in the direction of point C.

The q-axis current $I_q$ is also reduced as well as the d-axis current $I_d$ in the above-described flux weakening control. However, a gradient of the constant torque curve is not constant but varies according to the current value as shown in FIG. 6. Accordingly, an angle of the flux weakening current vector needs to be adjusted according to existing current in order that the flux weakening control may be carried out so that the current vector moves on the constant torque curve.

Figure 7:
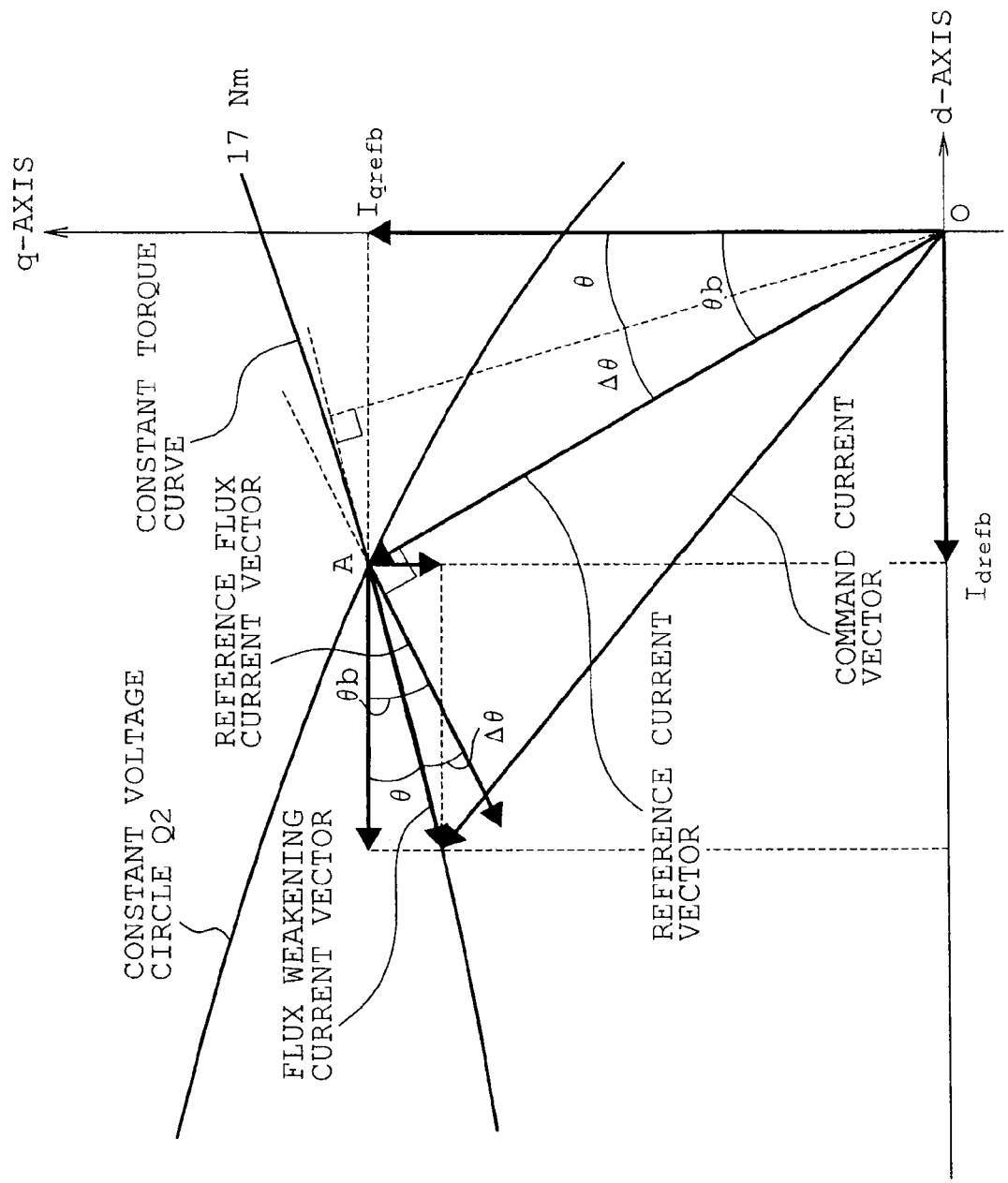
FIG. 7 is a vector diagram showing relationship among reference current vector, flux weakening current vector and command current vector.

The flux weakening current computing section 27 adds a flux weakening current vector to the reference current vector thereby to determine a command current vector as shown in FIG. 7. The flux weakening current vector is set along the constant torque curve, whereby the command current vector is moved on the constant torque curve with the result that torque variations due to the flux weakening control is prevented. The flux weakening angle computing section 18 determines the angle θ of the flux weakening current vector so that computed torque T corresponds with command torque $T_{ref}$. This can determine the direction of an optimum flux weakening current vector which can prevent occurrence of disturbance even at any point on the dq coordinate axis as shown in FIG. 6.

More specifically, the reference d-axis current $I_{drefb}$ and the reference q-axis current $I_{qrefb}$ are determined by the reference current determining section 12 and supplied to the reference angle computing section 21. The reference angle computing section 21 then computes an arctangent function A tan with the use of equation (8), thereby obtaining a reference angle $θ_b$ of the reference current vector:

$$θ_b = A\tan(-I_{drefb}/I_{qrefb}) \quad (8)$$

The angle θ of the flux weakening current vector (reference flux weakening current vector) becomes equal to the reference angle $θ_b$ when the corrected angle Δθ supplied from the PI computing section 20 is zero. An actual reference flux weakening current vector on the dq coordinate axes in this case is obtained as an angle (a tangential direction of a circle passing through point A about the origin O) by addition of 90° to angle θ ($=θ_b$).

However, when the flux weakening current vector is used in the case of the constant torque curve as shown in FIGS. 6 and 7, the command current vector is shifted inward from the constant torque curve of 17 Nm, whereupon the output torque becomes insufficient. The flux weakening angle computing section 18 performs a PI computation with respect to the torque difference ΔT obtained by subtracting computed torque T from the command torque $T_{ref}$, thereby obtaining a correction angle Δθ. The flux weakening angle computing section 18 then obtains the angle θ of the flux weakening current vector using equation (9):

$$θ = θ_b - Δθ \quad (9)$$

The torque difference ΔT and the correction angle Δθ become positive when output torque is insufficient. Accordingly, the angle θ of the flux weakening current vector become smaller by correction angle Δθ than the reference angle $θ_b$. Consequently, the flux weakening current vector is adjusted in the direction along the constant torque curve with the result that the output torque T corresponds with the command torque $T_{ref}$.

Furthermore, the constant torque curve as shown in FIG. 5 creates an arc slightly convex downward. Accordingly, it is understood that the angle θ of the flux weakening current vector needs to be rendered smaller on the constant torque curve as shown in FIG. 7 as the flux weakening current is increased. In this case, too, since the torque T is shifted from the command torque $T_{ref}$, the PI computing section 20 is operated so that the torque T and the command torque $T_{ref}$ correspond with each other, whereby the correction angle Δθ is reduced relative to the reference angle θb. This realizes the flux weakening control under the condition where the output torque T of the motor 2 corresponds with the command torque $T_{ref}$.

The voltage amplitude $V_{dq}$ generated by the inverter 4 and the DC voltage $V_{dc}$ are supplied into the flux weakening amplitude computing section 23. The flux weakening amplitude computing section 23 carries out a PI computation to generate and supply a flux weakening current vector amplitude $I_{ampref}$ so that the voltage amplitude $V_{dq}$ is not more than the DC voltage $V_{dc}$ (see FIG. 3). The flux weakening current computing section 27 computes the command d-axis current $I_{dref}$ and the command q-axis current $I_{qref}$ on the basis of the angle θ and amplitude $I_{ampref}$ of the flux weakening current vector and the reference d-axis current $I_{drefb}$, and the reference q-axis current $I_{qrefb}$, using the respective equations (10) and 11:

$$I_{dref} = I_{drefb} - I_{ampref} \times \cos θ \quad (10)$$

$$I_{qref} = I_{qrefb} - I_{ampref} \times \sin θ \quad (11)$$

Figure 8:
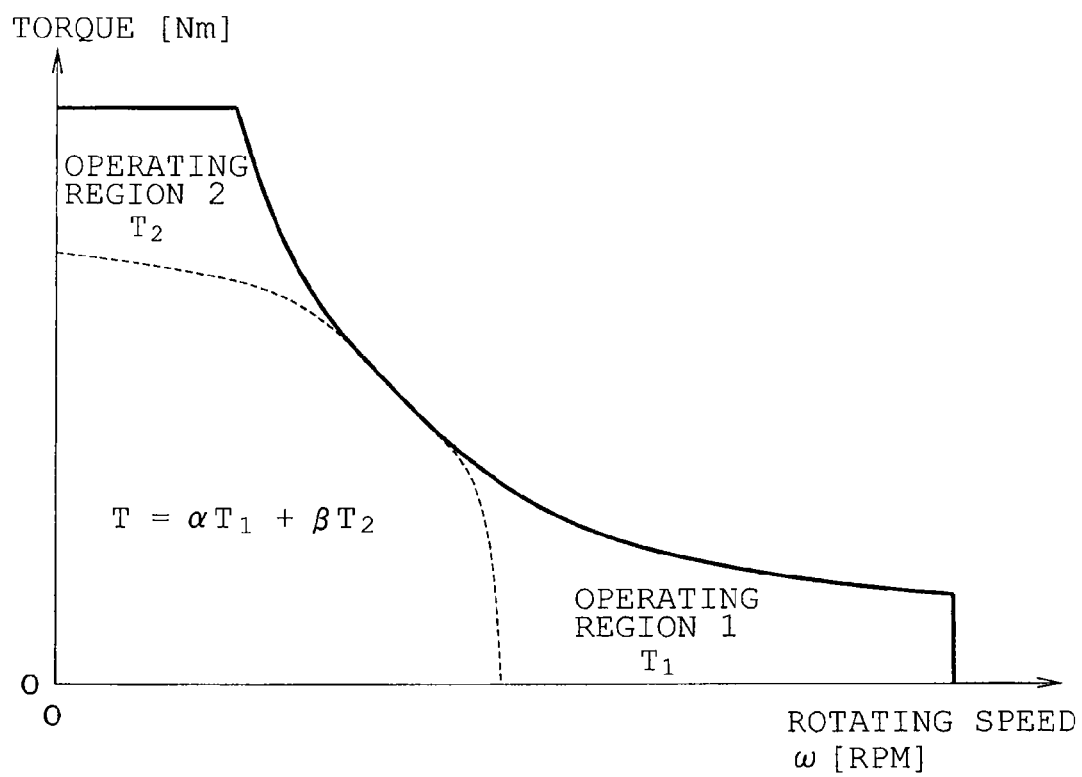
FIG. 8 is a graph showing rotational speed-torque characteristic and a switching condition of torque operation method.

The torque computing section 17 computes using equation (1) to obtain the first output torque T1 and using equation (2) to obtain the second output torque T2, as described above. FIG. 8 depicts a rotating speed-torque characteristic of the motor 2 and a switching condition for the torque computing manner. An operating region 1 is a high-speed low-torque region in which iron loss cannot be ignored as loss of the motor 2. When computation is performed to obtain the output torque T2 in the operating region 1 using equation (3), the possibility that the difference between the iron loss obtained by the computation and an actual iron loss would be rendered larger becomes higher. On the other hand, since the motor current is small in the operating region 1, there is little influence of magnetic saturation due to energization by a large current, with the result that there is little drop in inductances $L_d$ and $L_q$. More specifically, the first output torque T1 is used in the high-speed low-torque region 1 since error in the first output torque T1 is smaller than error in the second output torque T2.

On the other hand, an operating region 2 is a low-speed high-torque region. Since the rotating speed is low in the operating region 2, an amount of iron loss is smaller and error in the output torque T2 obtained by using equation (3) is small. However, energization by the large current reduces the inductances $L_d$ and $L_q$ by the influence of magnetic saturation with the result that error in the output torque T1 obtained by the computation using equation (1) is increased. More specifically, the second output torque T2 is used in the low-speed high-torque region 2 since error in the second output torque T2 is smaller than error in the first output torque T1.

In a medium speed medium torque operating range except for the operating regions 1 and 2, a weighted mean of the first output torque T1 and the second output torque T2 is obtained according to the rotating speed ω and torque T to serve as output torque of the motor 2, as shown by equations (12) and (13):

$$T = \alpha T1 + \beta T2 \tag{12}$$

$$\alpha + \beta = 1, \alpha, \beta \geq 0 \tag{13}$$

In this case, the factor α is rendered larger as the motor 2 is near the operating region 1 and the factor β is rendered larger as the motor 2 is near the operating region 2. As a result, the output torque obtained by computation is an intermediate value between the first output torque T1 and the second output torque T2 according to the rotating speed ω and torque T. When the above-described computing manner is employed, error in the obtained torque T is rendered smaller and the angle θ of the flux weakening current vector can be determined more accurately.

The above-described high, low and medium speeds, and high, low and medium torques are those marked off or separated by a threshold (shown by broken line in FIG. 8) predetermined according to the characteristics of the motor 2.

In the above-described embodiment, since the flux weakening current vector is adjusted to the orientation along the constant torque curve, torque variations associated with the flux weakening control can be suppressed, whereupon the flux weakening control can be carried out stably and effectively irrespective of the motor characteristics, an operating range and a current carrying condition. In this case, since the PI computation is carried out to obtain the angle θ and amplitude $I_{ampref}$, data of constant torque curve need not be previously obtained for every type of motor. Furthermore, there is a relation between an amount of deviation of the flux weakening current vector from the constant torque curve and an amount of change in torque. Since this relation is nearly linear, the PI computation effectively works. Mutual interference between the amplitude $I_{ampref}$ and the angle θ can be prevented since adjustment of the amplitude $I_{ampref}$ is free from influence of adjustment of the angle θ.

The torque computing section 17 computes the first output torque T1 as an addition of the magnet torque and the reluctance torque and divides mechanical output power by the rotating speed ω to obtain the second output torque T2. Thus, since output torques T1 and T2 are used in different manners according to the rotating speed ω and the torque T, error in the obtained torque T can be reduced.

In the flux weakening control in the embodiment, the computation is rendered easier and an amount of computation can be reduced when data tables are used for operation of a tan, sin and cos. Consequently, an increase in processing load of the microcomputer is advantageously small.

The above-described embodiment may be modified as follows. The flux weakening amplitude computing section 23 may have a voltage margin with respect to the maximum voltage the inverter 4 is capable of generating. More specifically, the subtractor 24 may obtain the flux weakening current amplitude $I_{ampref}$ based on the voltage difference ΔV obtained by subtracting from voltage amplitude $V_{dq}$ the result of subtraction of voltage margin $V_m$ from DC voltage $V_{dq}$.

The reference current vector is used when the flux weakening control is not carried out. The reference current determining section 12 may determine the reference d-axis and q-axis currents $I_{drefb}$ and $I_{qrefb}$ base on a criterion different from the criterion of rendering the current amplitude minimum.

The voltage amplitude computing section 16 obtains the voltage amplitude $V_{dq}$ of the motor terminal voltage from the command d-axis voltage $V_{dref}$ and the command q-axis voltage $V_{qref}$ in the foregoing embodiment. However, the motor control device may include a sensor which detects a motor terminal voltage. The voltage amplitude computing section 16 may obtain the voltage amplitude $V_{dq}$ from the motor terminal voltage value detected by the sensor.

The current sensors 7u, 7v and 7w may be shunt resistances provided between lower arm switching elements of the inverter 4 and the DC power source line respectively.

The torque computing section 17 may be of any type that is configured to compute the output torque of the motor 2.

The flux weakening angle computing section 18 may be of any type that is configured to determine the angle θ of the flux weakening current vector added to the reference current vector so that the command torque $T_{ref}$ corresponds with the torque T obtained by operation.

The flux weakening amplitude computing section 23 may be of any type that is configured to determine the amplitude $I_{ampref}$ of the flux weakening current vector so that the terminal voltage of the motor 2 is not more than the maximum voltage applicable to the motor 2.

According to the above-described embodiment, the flux weakening control can be carried out on the basis of a stable and easy computation irrespective of the motor characteristics, operating range and current carrying condition.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A motor control device comprising:
a torque computing section which computes an output torque of an electric motor which is capable of generating magnetic torque by permanent magnets and reluctance torque;
a flux weakening angle computing section which determines an angle of a flux weakening current vector that is added to a reference current vector so that a command torque value and the computed output torque value correspond with each other;
a voltage acquiring section which acquires a terminal voltage of the motor;
a flux weakening amplitude computing section which determines an amplitude of the flux weakening current vector so that the terminal voltage of the motor is not more than a maximum voltage applicable to the motor; and
a command current computing section which computes a command current vector by adding the flux weakening current vector to the reference current vector.

2. The device according to claim 1, wherein the flux weakening angle computing section subtracts from an angle of the reference current vector a correction angle according to a torque difference obtained by subtracting the computed torque from the command torque value, thereby determining an angle of the flux weakening current vector.

3. The device according to claim 1, wherein the flux weakening amplitude computing section determines that amplitude of the flux weakening current vector is set at zero when the terminal voltage of the motor is lower than the maximum applied voltage, and when the terminal voltage of the motor is not less than the maximum applied voltage, the flux weakening amplitude computing section increases the amplitude of the flux weakening current vector according to a voltage difference obtained by subtracting the maximum applied voltage from the terminal voltage of the motor.

4. The device according to claim 1, wherein the torque computing section adds to the reluctance torque the magnet torque obtained using an armature interlinkage magnetic flux, a d-axis current, a q-axis current, a d-axis inductance and a q-axis inductance, thereby computing a first torque;
the torque computing section subtracts a copper loss and an iron loss from an output power thereby to obtain a subtraction result and divides the subtraction result by a rotating speed, thereby computing a second torque;
the torque computing section sets the first torque as an output torque when the motor is in a high-speed low-torque operating region; and
the torque computing section sets the second torque as the output torque when the motor is in a low-speed high-torque operating region.

5. The device according to claim 2, wherein the torque computing section adds to the reluctance torque the magnet torque obtained using an armature interlinkage magnetic flux, a d-axis current, a q-axis current, a d-axis inductance and a q-axis inductance, thereby computing a first torque;
the torque computing section subtracts a copper loss and an iron loss from an output power thereby to obtain a subtraction result and divides the subtraction result by a rotating speed, thereby computing a second torque;
the torque computing section sets the first torque as an output torque when the motor is in a high-speed low-torque operating region; and
the torque computing section sets the second torque as the output torque when the motor is in a low-speed high-torque operating region.

6. The device according to claim 3, wherein the torque computing section adds to the reluctance torque the magnet torque obtained using an armature interlinkage magnetic flux, a d-axis current, a q-axis current, a d-axis inductance and a q-axis inductance, thereby computing a first torque;
the torque operation section subtracts a copper loss and an iron loss from an output power thereby to obtain a subtraction result and divides the subtraction result by a rotating speed, thereby computing a second torque;
the torque operation section sets the first torque as an output torque when the motor is in a high-speed low-torque operating region; and
the torque computing section sets the second torque as the output torque when the motor is in a low-speed high-torque operating region.

7. The device according to claim 4, wherein in another operating region other than the high-speed low-torque operating region and the low-speed high-torque operating region, the torque computing section obtains a weighted mean of the first torque and the second torque according to a rotating speed and torque thereby to use the obtained weighted mean as an output torque of the motor.

8. The device according to claim 5, wherein in another operating region other than the high-speed low-torque operating region and the low-speed high-torque operating region, the torque computing section obtains a weighted mean of the first torque and the second torque according to a rotating speed and torque thereby to use the obtained weighted mean as an output torque of the motor.

9. The device according to claim 6, wherein in another operating region other than the high-speed low-torque operating region and the low-speed high-torque operating region, the torque computing section obtains a weighted mean of the first torque and the second torque according to a rotating speed and torque thereby to use the obtained weighted mean as an output torque of the motor.

10. The device according to claim 1, further comprising a reference current determining section which determines the reference current vector so that a current amplitude requisite for output of a command torque becomes minimum.

11. The device according to claim 2, further comprising a reference current determining section which determines the reference current vector so that a current amplitude requisite for output of a command torque becomes minimum.

12. The device according to claim 3, further comprising a reference current determining section which determines the reference current vector so that a current amplitude requisite for output of a command torque becomes minimum.

13. The device according to claim 4, further comprising a reference current determining section which determines the reference current vector so that a current amplitude requisite for output of a command torque becomes minimum.

14. The device according to claim 5, further comprising a reference current determining section which determines the reference current vector so that a current amplitude requisite for output of a command torque becomes minimum.

15. The device according to claim 6, further comprising a reference current determining section which determines the reference current vector so that a current amplitude requisite for output of a command torque becomes minimum.

16. The device according to claim 7, further comprising a reference current determining section which determines the reference current vector so that a current amplitude requisite for output of a command torque becomes minimum.

17. The device according to claim 8, further comprising a reference current determining section which determines the reference current vector so that a current amplitude requisite for output of a command torque becomes minimum.

18. The device according to claim 9, further comprising a reference current determining section which determines the reference current vector so that a current amplitude requisite for output of a command torque becomes minimum.

* * * * *